United States Patent [19]
Agnese

[11] 3,915,492
[45] Oct. 28, 1975

[54] EXPANDABLE TRAILER STRUCTURE

[76] Inventor: Rossini Agnese, 10-A via Appia Antica Ariccia, Rome, Italy

[22] Filed: June 12, 1973

[21] Appl. No.: 369,314

[52] U.S. Cl. .............................. 296/23 C; 296/26
[51] Int. Cl.² ......................................... B60P 3/32
[58] Field of Search ..................... 296/23 C, 26, 27; 280/34 R, 34 A; 74/89.14, 89.15, 89.16

[56] References Cited
UNITED STATES PATENTS

| | | | |
|---|---|---|---|
| 2,136,130 | 11/1938 | Gorlenko | 296/23 C X |
| 2,150,615 | 3/1939 | Sword | 296/26 |
| 2,193,352 | 3/1940 | Thomas | 296/23 C |
| 2,606,057 | 8/1952 | Johnson | 296/23 C |
| 2,636,773 | 4/1953 | Van Tassel | 296/23 C |
| 2,739,833 | 3/1956 | Schenkel et al. | 296/23 C |
| 2,965,412 | 12/1960 | Henderson et al. | 296/23 C |
| 3,449,971 | 6/1969 | Posh | 74/89.15 |
| 3,528,698 | 9/1970 | Miller | 296/27 |

FOREIGN PATENTS OR APPLICATIONS

| | | | |
|---|---|---|---|
| 485,330 | 5/1938 | United Kingdom | 296/23 C |
| 679,285 | 9/1952 | United Kingdom | 296/23 C |

*Primary Examiner*—Robert B. Reeves
*Assistant Examiner*—Charles A. Marmor
*Attorney, Agent, or Firm*—Robert E. Burns; Emmanuel J. Lobato; Bruce L. Adams

[57] ABSTRACT

A variable dimension structure for use as an expandable trailer. The structure has a floor with at least two sections and sidewalls each having two sections. The sections are mounted for movement relative to one another by a mechanical system of perpendicular rotationally driven shafts coupled together to translate the rotatory motion to movement along at least one axis. The sections may be moved by the manual turning of a crank or by the use of an electric motor powered by an automobile battery.

1 Claim, 12 Drawing Figures

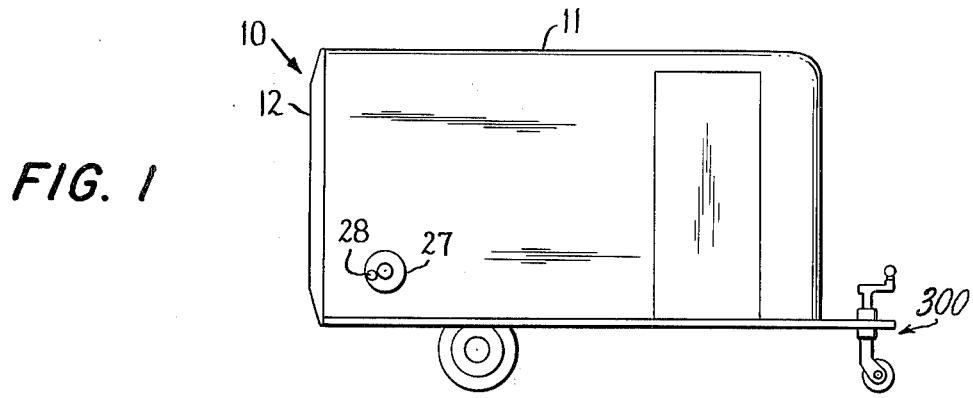
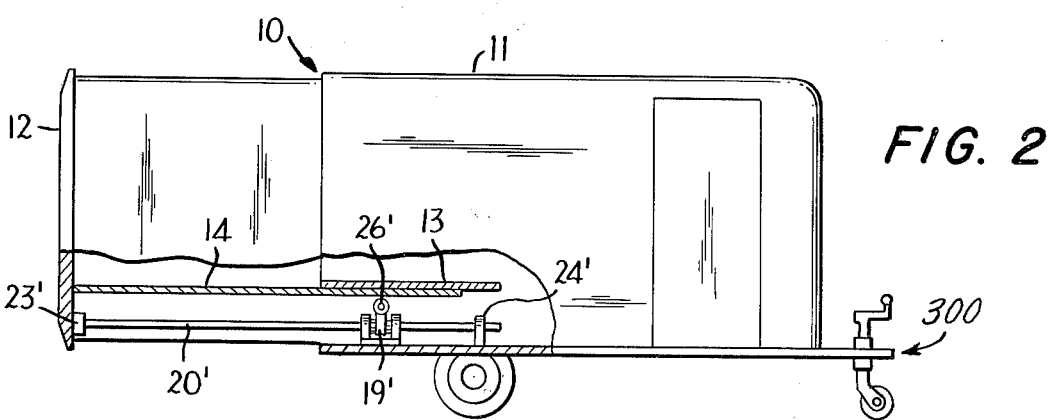
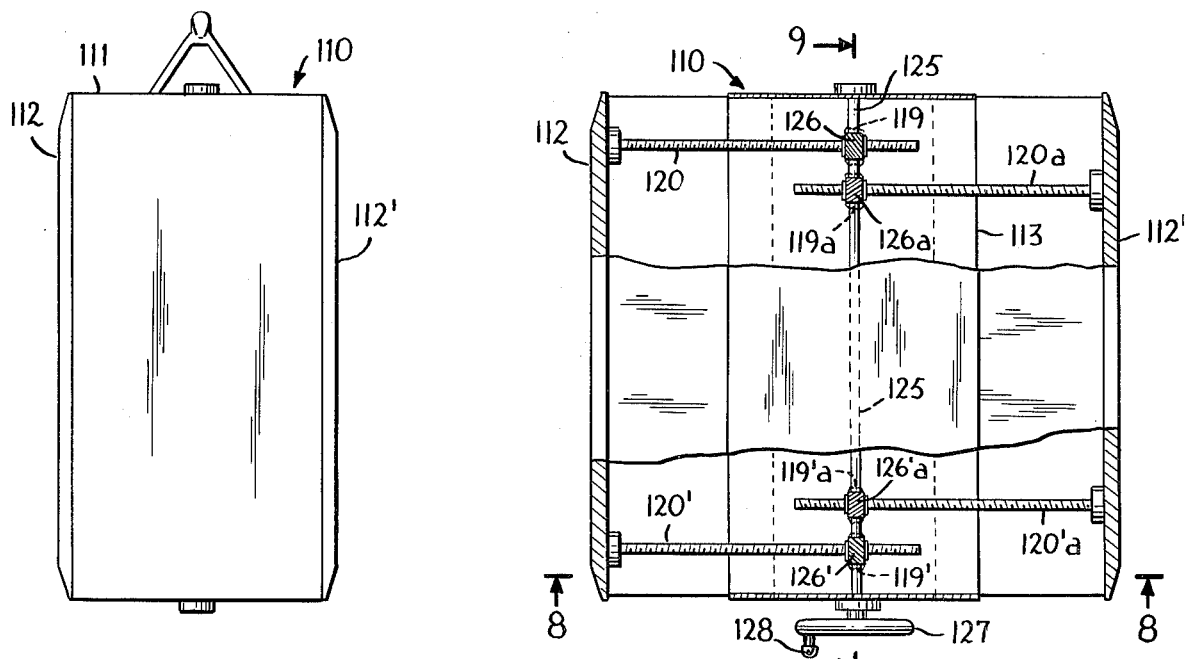

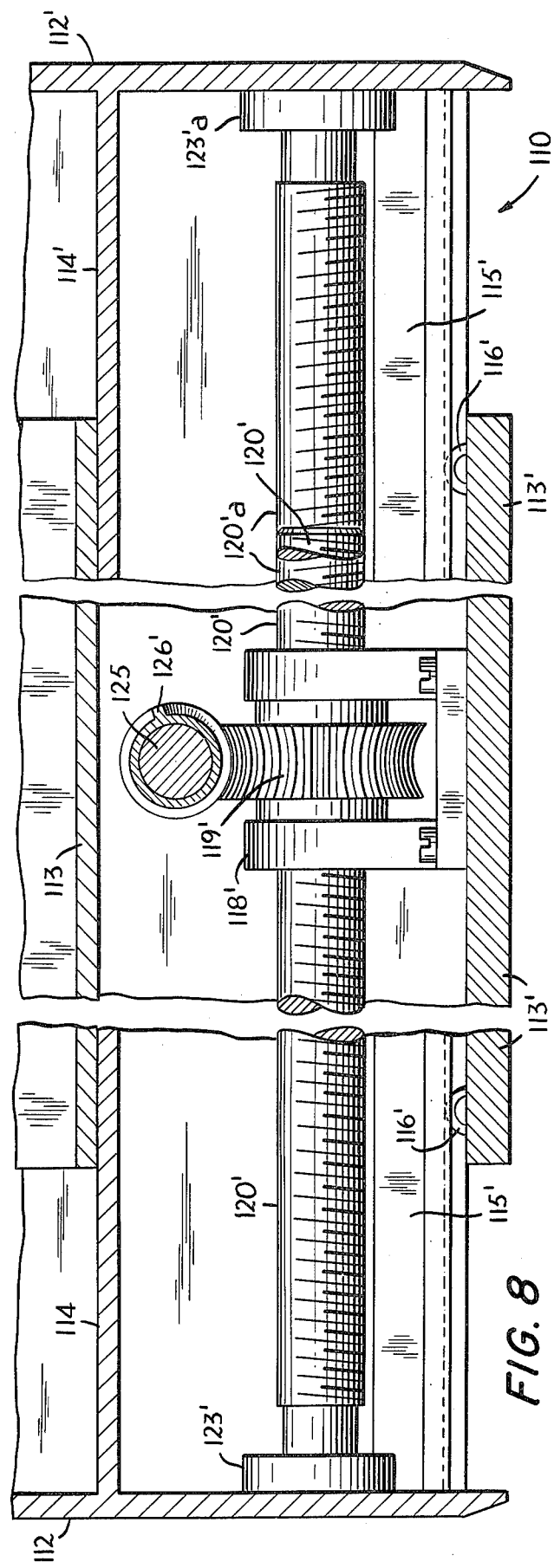
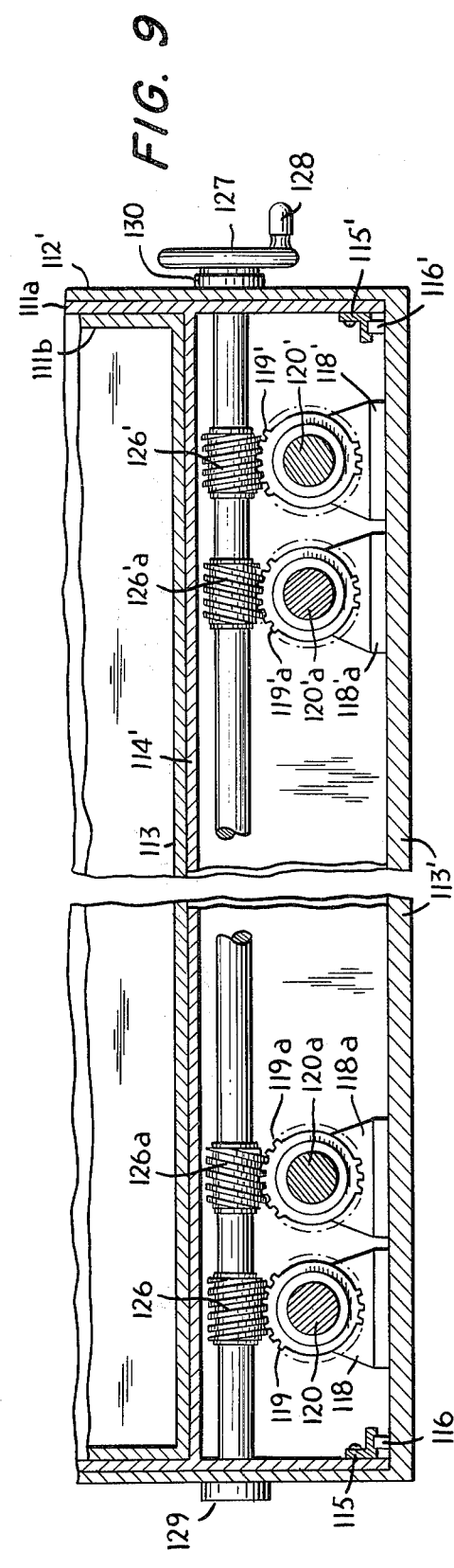
FIG. 8
FIG. 9

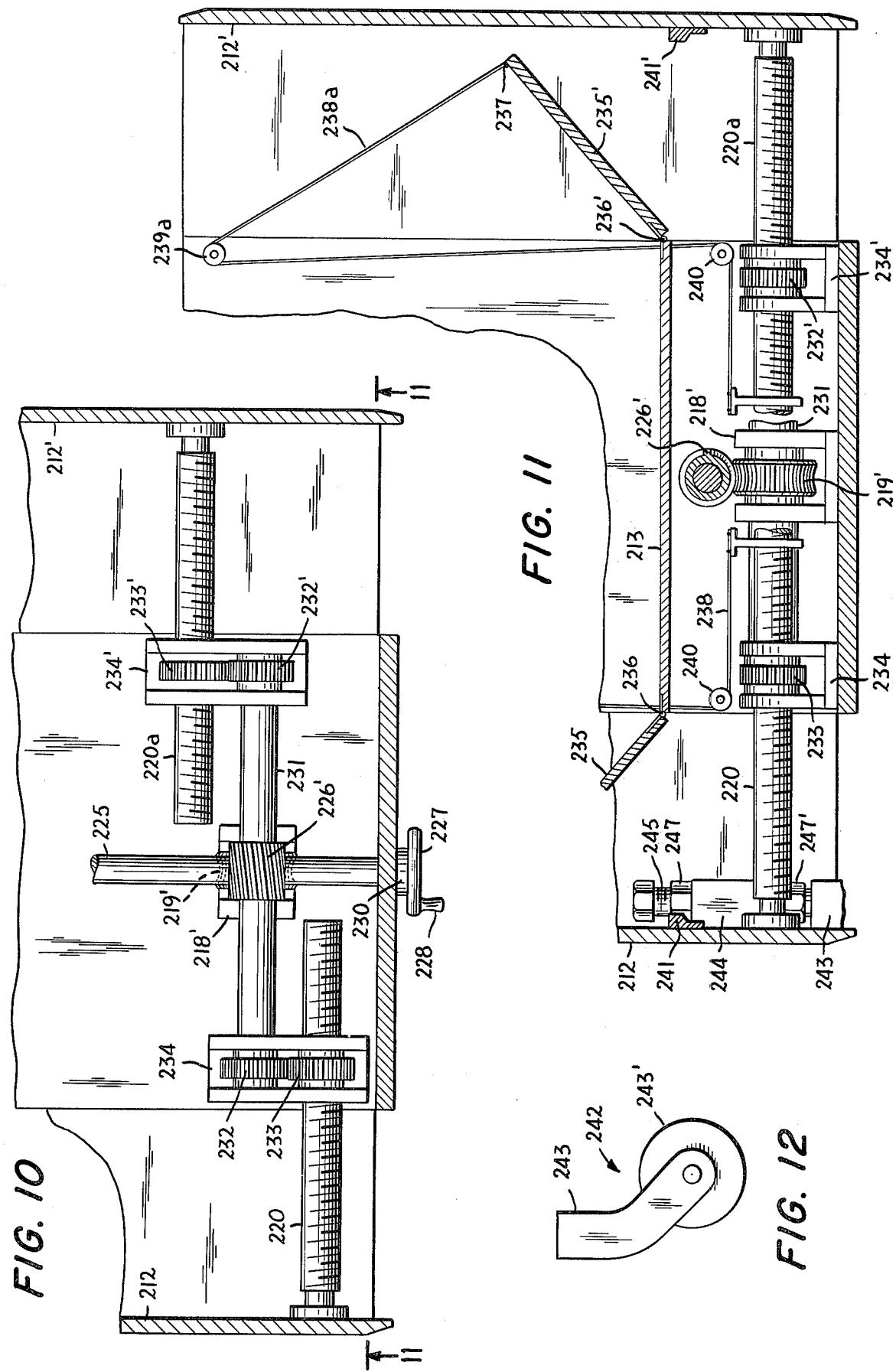

EXPANDABLE TRAILER STRUCTURE

The present invention relates a variable dimension structure for use as an expandable trailer.

While there have been many attempts at producing an expandable trailer, these trailers have been of limited size and utility.

The primary object of the present invention is to provide a variable dimension structure for use as an expandable trailer that may be widened or lengthened simply and quickly by means of a single control, either manual or motorized, which enables the desired dimension to be obtained.

Another object of the present invention is to provide a mechanical system which permits variations in the dimensions of the structure and which may be controlled either manually or by an electric motor.

Still another object of the present invention is to place the mechanical system below the floor of the structure to provide an increase in the space available in the trailer.

A still further object of the present invention is to provide a mechanical system which is driven by a single control operated manually from outside the structure or driven by an electric motor powered from the battery of the vehicle towing the trailer.

Yet another object of the present invention is to provide a varialble dimension structure having four sections that are movable relative to one another by angular displacement or by the sliding thereof in one plane.

These and other objects of the present invention are obtained by variable dimension structure for use as an expandable trailer as disclosed herein. The structure comprises a floor having at least two sections, at least two sidewalls each having two sections, mounting means mounting the floor sections and the sidewalls sections for adjustable reciprocable movement of one section of the floor and each sidewall section relative to the other section thereof along at least one axis thereof to increase and decrease the dimension of the floor and the sidewalls along the one axis thereof, and means for effecting movement of the one section of the floor and each sidewall relative to the other section thereof along one axis thereof.

The mounting means comprises means rotationally driven during use and means coupled thereto for translating the rotational movement thereof to movement along the one axis. The means rotationally driven during use includes a rotatably driven shaft disposed perpendicular to the one axis and wherein the means for translating comprises at least one worm gear fixedly mounted on the shaft and rotatable therewith, a rotatable member having a threaded interior and external helical teeth meshing with the worm gear and rotationally driven about the one axis in response to rotation of the worm gear. A threaded shaft is provided and disposed parallel to the one axis and connected at one end to one section of the floor and meshing with the threaded interior of the member and movable along the one axis in response to the rotational movement of the member.

The means for effecting movement includes manually actuated means for reciprocable moving one section of the floor and each sidewall. The means for effecting movement may also include mechanical means including a motor which may be an electric motor energized by an automobile battery.

Having in mind the above and other objects that will be obvious from an understanding of the disclosure, the present invention comprises the combinations and arrangements of parts illustrated in the presently preferred embodiment of the invention which is hereinafter set forth in sufficient detail to enable those persons skilled in the art to clearly understand the function, operation, construction, and advantages of it when read in conjunction with the accompanying drawing.

BRIEF DESCRIPTION OF THE DRAWINGS

FIG. 1 is a schematic elevation view of one side of a trailer, according to the present invention, which can be lengthened, when it is in a position to be towed;

FIG. 2 is a schematic cut-away view of one side of the expandable trailer, shown in FIG. 1 showing the mechanical system for expanding the size of the trailer;

FIG. 6 is a schematic plan of an expandible trailer according to the present invention, which can be expanded on two sides;

FIG. 7 is a schematic cut-away view of the FIG. 6 trailer when expanded and the mechanical system;

FIG. 8 is a cross-section view of FIG. 7 along line 8—8;

FIG. 9 is a cross-section view of FIG. 7 along line 9—9;

FIG. 10 is a cross-section view of another embodiment of the mechanical system shown in FIG. 7;

FIG. 11 is a cross-section view of FIG. 10 along line 11—11;

FIG. 12 is a expanded drawing of a runner shown in FIG. 11.

DESCRIPTION OF THE PREFERRED EMBODIMENTS

Figure 3:
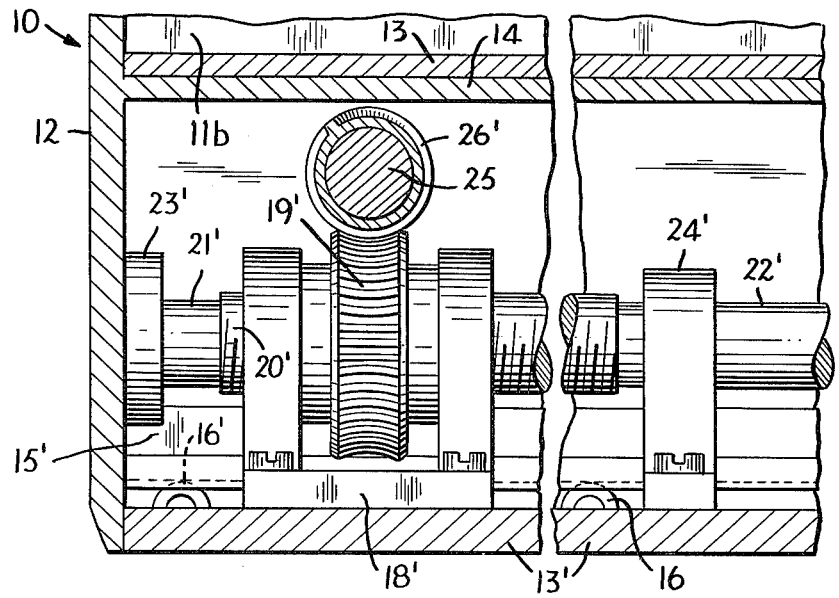
FIG. 3 is a detailed sectional view of a portion of the mechanical apparatus shown in FIG. 2.

Referring to the drawings and more specifically one embodiment of the expandible trailer of the present invention is indicated by numeral 10. In FIG. 1, the trailer 10 is in a closed or towing condition. The bodywork consists of a main external structure 11, and sections 12 and 12' which move relative to 11 to produce an expanded trailer. The rear end 12 of the trailer is connected to the ensemble of top and sidewalls 12' fitted into the hollow space left between the outer walls 11a and inner walls 11b of the fixed part of the bodywork.

Floor section 13 is a part of the fixed part of the bodywork which includes the lower frame with supporting base 13'. Floor section 14 is integral with the rear wall 12 of the trailer and runs beneath the floor section 13 and is movable relative thereto.

Steel sections 15 and 15', fixed along the bottom of walls 12' on the innerside, are designed to rest on rollers 16, 16' — present in suitable numbers and at appropriate spacings — to facilitate extension and retraction of the extensible sections 12, 12' of the trailer. The seats of these rollers are on the lower base 13' of the fixed part of the trailer.

In this example, provision is also made for rollers 17 carried along the inside free edge of the sliding floor 14. The purpose of these is to facilitate the sliding action and to provide a sufficient number of intermediate bearing points against the lower surface of fixed floor section 13, which in itself will be useful when the trailer is extended and fully in use.

The mechanical system for effecting movement of the extensible section 12, 12' from the fixed structure of the bodywork 11 comprises a worm/helical gear system utilizing either a manually operated or motorized primary drive component, which makes the extensible part of trailer 10 move outwards or close up. To this end, on the inside of base 13' of the bodywork 11 there are two bearings 18, 18' for the two corresponding helical gears 19, 19'. Each of these bearings 18, 18' takes the form of a U-bracket which permits only the rotation of the helical gears 19, 19' in respective bushings (not shown) in the arms of the U-brackets.

The helical gears 19, 19' are also threaded internally so that they can act on corresponding rods 20, 20' with similar threads. The cylindrical ends 21, 21', 22 and 22' of rods 20, 20' are carried in bearings 23, 23' which are integral with the outer wall 12 of the extensible part, and 24, 24' fixed on the inner surface of base 13.

The threaded rods 20, 20' will only be able to move axially when the rotation of shaft 25 and the worm gears 26, 26' appropriately fixed thereto transmits rotary movement to the helical gears 19, 19' to which they are mated.

In the example of manual control illustrated in FIGS. 1–5, the operator can turn handwheel 27 by means of handle 28 and, by rotating the shaft 25 in one sense or the other, will obtain the desired movement of the extensible sections 12, 12', due to the interconnection of the gears.

Figure 5:
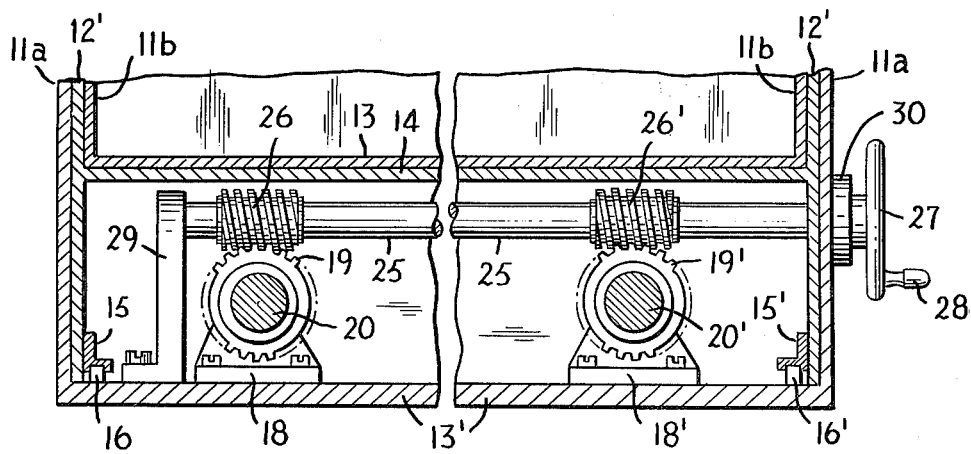
FIG. 5 is a cross sectional perpendicular to the view of the mechanical system of FIG. 1.

In this respect, it may be added that shaft 25 which has worm gears 26, 26', rotates at its ends in support bushings 29 and 30 which, in FIG. 5, are fixed respectively on the surface of base 13' and on the external wall 11a of the fixed structure 11 of the bodywork.

Figure 4:
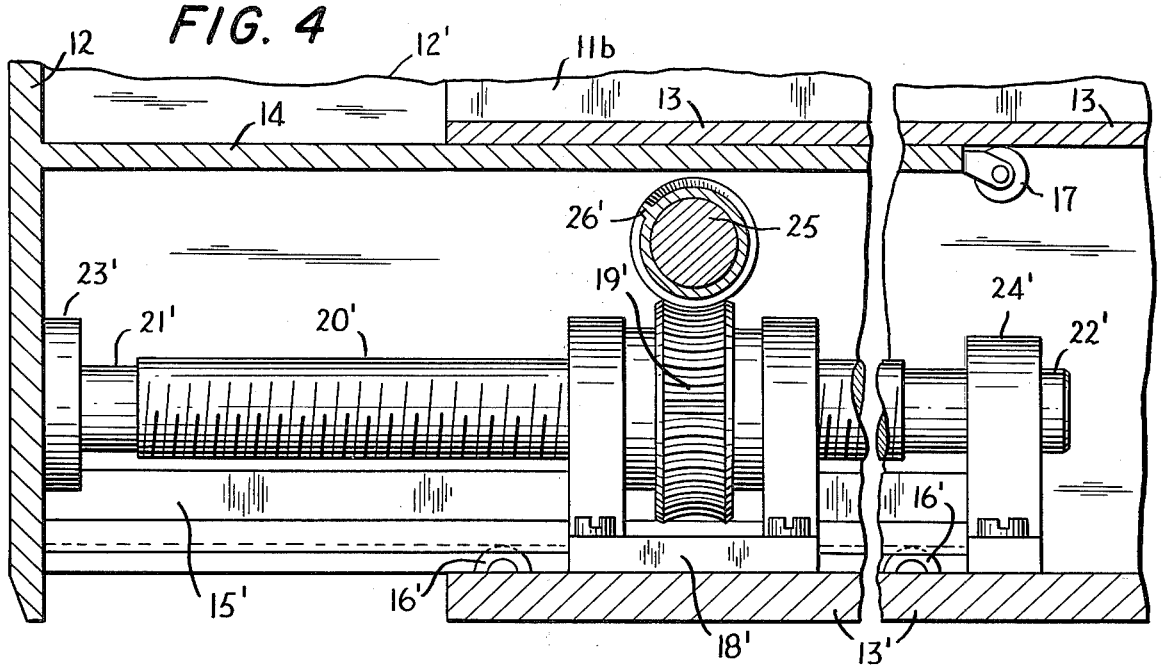
FIG. 4 is a sectional view of the mechanical system shown in FIG. 3 when the trailer is expanded.

It might also be added that, apart from a conventional carriage 300 for these types of vehicles, another similar one may by mounted at section 12 of the extension in such a way that it is integral therewith, when the operation of extending the trailer is performed as in FIGS. 2 and 4. Mention will again be made of this carriage below, since it may also be involved in trailers that can be enlarged sideways.

FIGS. 6–11 refer to a mechanical system for widening a trailer when, as is assumed in the case of trailer 110, both sides are involved in the enlargement.

FIGS. 6–9 concern bilateral enlargement to an extent amounting to almost half the width of the trailer on each side, thus virtually doubling the width thereof. FIGS. 10 and 11, instead, relate to a mechanical system for insuring bilateral enlargement amounting to even more than half the width of the trailer on each side thereof.

In FIG. 6, the external walls 112, 112' of trailer 110 naturally rest against the corresponding edges of the main central body 111 of the trailer. Even from the schematic diagram, FIG. 7, in which the internal mechanism is visible, it can be seen that the worm/helical gear concept is again used for the simultaneous bilateral widening of trailer 110. In this case, too, only a single operation, manual in this instance, is involved. From FIG. 7 and the details illustrated in FIGS. 8 and 9, it can be seen that with this form of construction there is a single shaft 125 set lengthwise in the central part between the fixed floor section 113 and the base 113'. In the drawings, which are simplified for clarity, the shaft 125 is supported by two support bushings 129, 130, which are fixed on the front and rear walls of the trailer.

As it is necessary to drive the sections to effect the widening of both sides of trailer 110, four worm/helical gear systems are used in this case, because of the length of the trailer, it is advisable that control of the movement should take place near both ends of wall 112 and wall 112', thus guaranteeing that movement occurs smoothly and simultaneously at both sides.

Shaft 125 carries worm gears 126 and 126' for enlarging section 112, and 126a and 126'a for enlarging section 112'. These worm gears are mated respectively to helical gears 119, 119' and 119a, 119'a. which are carried in bearings 118, 118' and 118a, 118'a, as previously described for extensible trailer 10. As only one drive is involved through shaft 125, it will be readily understood that the two movable wall sections 112, 112' can be made to move in opposite directions to enlarge or close up the trailer by suitably setting the threads of the threaded shafts 120, 120' and 120a and 120'a, as illustrated in FIG. 8. By selecting the same pitch for the teeth and worm gears, and also for the threads which insure rectilinear movement of threaded shafts 120, 120' and 120a, and 120'a, it is possible to insure the simultaneous inwards or outwards movement of the enlargeable parts 112 and 112' when the operator moves handwheel 127 in the desired direction by means of handle 128.

According to the drawings in FIGS. 7 and 8, with the single shaft 125 positioned centrally along the length of trailer 110 it should theoretically be possible to move the bilateral movable parts 112 and 112' for a distance equal to half the width of the trailer. However, in practice, this amount of movement is not possible since cross shafts 120, 120' and 120a, 120'a require a sufficient guide length in the area where they are threaded through helical gears 119, 119' and 119a, 119'a, respectively, which are also in the central area to directly drive these cross shafts.

With another form of construction of the mechanism, as shown schematically in FIGS. 10 and 11, not only is it possible to obtain greatter enlargement on both sides of the trailer, but also a different kind of movement of sections of floor which flank both sides of the fixed, central section of the floor in the main body of the trailer. Instead of sliding movement, as in the two forms of construction described and illustrated in FIGS. 1–9, the auxiliary sections of floor move in an angular manner.

In this other form of construction, wherein the trailer enlarges bilaterally, there is again a single main shaft rotating in bearings set at the front and rear ends of the main bodywork. For greater clarity only bearing 230 is shown.

With this form of construction of the mechanical system for trailers designed to be enlarged, there are only two worm gears on the main drive shaft 225; of these, only 226' is illustrated in FIG. 10. Bearing 218', similar to 118 and 18 already described, permits only rotation of helical gear 219' mated with worm gear 226'. Unlike the cases dealt with earlier, cross shaft 231 is integral with helical gear 219'. At each end of this cross shaft there is a gear, 232 and 232' mated respectively with gears 233, 233' that can rotate in the seats in the relative bearings 234, 234', each of which may be suitable for the pair of intermeshed gears, namely 232, 233 and 232' and 233'. Each of gears 233, 233', with parallel axes spaced for operational requirements, has a coaxial threaded hole which mates with the thread of the corresponding threaded shaft 220, 220a. One end of the threaded shafts 220 and 220a, and one end of the other similar pair of shafts not shown, is fixed to the relevant outer movable wall, 212, 212'. The handling of the threads on 220, 220a is different, as shown schematically in FIGS. 10 and 11, so when the main drive shaft 225 is turned by rotating handwheel 227 by means of handle 228 (in the example the drive shown is manual) threaded shaft 220 produces translational movement (as does the other parallel shaft — not shown — at the other end of the trailer) in a direction which is opposite to that of shaft 220a (and of the other parallel shaft — not shown — at the other end of the trailer). Consequently there is equal but opposite movement of both movable parts, 212, 212', designed to widen the trailer.

In view of the position of the driving gear for the opposed movements, 233 and 233' respectively, the corresponding cross shafts 220 and 220a can move more than in the case dealt with in FIGS. 6–9.

As stated, this form of construction provides for angular movement of the lateral sections 235, 235' of the floor. This movement occurs at the same time as the translational movement of 212 and 212' and is linked thereto. One edge of these lateral parts 235, 235' is connected to the adjacent edge of the fixed floor by a hinge 236, 236'. The parallel outermost edge 237, 237' of lateral floors 235 and 235' provides support for a tape 238, 238a which passes over upper and lower guide pulleys 239, 239a and 240, and 240a, while the other end of the tape is fixed towards the free end of the corresponding threaded cross shaft 220, 220a.

As will readily be understood, in this way the translational movements of shafts 220, 220a referred to above will result in the tape 238, 238a being paid out or drawn in, thus producing the desired angular movement of the additional section of the floor 235, 235'. All this is achieved with a single control operation involving the manual actuation of handwheel 227 or similar motorized actuation of a rotary drive, to turn the main shaft 225 of the mechanical system which forms the object of this invention. The angular movement of 235 and 235', with this form of construction, is designed to be 90°. In this way the auxiliary sections of the floor can be moved from the vertical position they assume when the trailer is closed for towing, to the horizontal position they adopt when the trailer is completely enlarged and has a single floor formed by the upper surfaces of 235, 213 amd 235'. Brackets 241' running horizontally along the inner surfaces of 212' provide the necessary support along the free edges 237, 237' for the floor of the completely enlarged trailer.

Both in the case when the trailer is completely extended and in that when it is enlarged on one or both sides — as in the examples selected here and shown in FIGS. 6–9 and 10 and 11 — an auxiliary carriage may be useful at the outermost extremity of the extended or widened sections. FIGS. 11 and 12 illustrate such an instance. Here the carriage or dolly 242 has an upright 243 which may, at the desired moment, be bolted to a screw 245 set in a special mounting 244 which is fixed to the inner part of movable wall 212. An appropriate movement of bolt 245 acting on its head 246, as well as of auxiliary nuts 247, 247' enables upright 243 to be screwed up and clamped, allowing some possibility of adjusting wheel 243' of carriage 242 to the ground level. It is apparent that a telescopic upright 243 similar to a conventional shock absorber would be preferable since it is more functional. It is also preferable that the outside section of the upright should be square or rectangular, with one side sliding along the inner surface of wall 212.

While preferred embodiments of the invention have been shown by way of example in the drawings, it will be understood that the invention is in no way limited to these embodiments.

It will be clear to trailer engineers, from this disclosure of the main embodiments of the invention, that with this system, apart from actuating the manual or motorized drive, no special operations are needed to transform a parked trailer into one with perhaps two or even more times as much space as is normally available when the unit is in its towing form. The very fact that the description concerns two trailers permitting varying degrees of widening on both sides, as well as a trailer which can be lengthened at its rear end, is intended to signify that what is illustrated and described refers to examples of the invention put to practical application; and that, therefore, possible modifications or variations which come within the general principles of the mechanical system which is the object of the invention itself are as of now to be understood as forming part thereof.

What I claim is:

1. A variable dimension structure for use as an expandable trailer, comprising;
    a floor having a principal axis and having a first floor section and a second floor section, the floor sections being vertically spaced apart by a floor space; first and second side walls disposed transversely of said principal axis; mounting means for mounting said side walls for reciprocable movement thereof relative to the floor along said principal axis of the floor; and means for effecting the reciprocable movement of the side walls for expanding the trailer, the latter means comprising;
    a horizontal drive shaft mounted in said floor space transversely of said principal axis for rotational movement of the shaft; and
    translating means coupled to said drive shaft and to the side walls for translating said rotational movement of the drive shaft to the reciprocable movement of the side walls along said axis, comprising;
    at least one worm gear fixedly mounted on said drive shaft and rotatable therewith;
    a rotatable member having external helical teeth meshing with said worm gear and rotationally driven by said worm gear;
    an intermediate rotatable shaft disposed parallel to said principal axis, fixed to said rotatable member, rotatable therewith, having two end portions each extending to an end portion of one of said floor sections and supported from said one floor section adjacent said end portion thereof;
    two gears each fixedly mounted on one of the end portions of said intermediate shaft and rotatable therewith;
    two threaded shafts parallel to said principal axis each having one end connected to a respective one of said side walls; and two rotatable members each having exterior teeth meshing with one of said two gears, and having a threaded interior portion receiving one of said two threaded shafts and meshing therewith, each member being rotationally driven in response to rotational movement of one of said two gears thereby moving said two threaded shafts along said principal axis;

thereby facilitating the expanding of the trailer while keeping the space between the side walls free and unobstructed.

* * * * *